United States Patent [19]
Hodge

[11] 3,805,321

[45] Apr. 23, 1974

[54] CASTER PROTECTOR FOR TRASH CONTAINER

[76] Inventor: Allan M. Hodge, 5852 Lomond, San Diego, Calif. 92120

[22] Filed: Feb. 8, 1973

[21] Appl. No.: 330,614

[52] U.S. Cl. .................... 16/18, 248/188, 280/64
[51] Int. Cl. .......................................... A47b 91/00
[58] Field of Search ............... 16/18, 34, 29, 44, 31; 52/99; 280/64, 79.1; 248/188, 188.2

[56] References Cited
UNITED STATES PATENTS 3,524,430  10/1970  Kesling et al. .................... 16/34
3,286,298  11/1966  Veary et al. ....................... 16/44

*Primary Examiner*—James T. McCall
*Assistant Examiner*—Doris L. Troutman
*Attorney, Agent, or Firm*—Richard K. MacNeill

[57] ABSTRACT

A caster protector for a trash container of the type that is lifted over a trash truck bed emptied by gravity and replaced upon a ground surface in which a plurality of shear pins couple a caster assembly to the trash container for shearing upon receiving a heavy impact and thereby protecting the caster itself from breakage.

4 Claims, 5 Drawing Figures

PATENTED APR 23 1974

3,805,321

CASTER PROTECTOR FOR TRASH CONTAINER

PRIOR ART

The following patents were uncovered as a result of a preliminary patentability search:
B. I. Ulinski U.S. Pat. No. 3,071,388
B. I. Ulinski U.S. Pat. No. 3,071,389
W. J. Veary et al U.S. Pat. No. 3,286,298

BRIEF DESCRIPTION OF THE INVENTION

The present invention relates to a caster protector, and more particularly to a caster protector for protecting trash container casters.

According to the invention, a caster is provided for trash containers in which an adaptor is fixedly attached to a container toward the bottom surface thereof. A caster assembly is coupled to the adaptor via a plurality of shear pins. Upon receiving a predetermined impact such as by garbage trash vehicle dropping the trash container abruptly upon a ground surface, the shear pins shear, uncoupling the caster assembly from the adaptor which results in no harm coming to the caster assembly. When this occurs, it is only necessary to replace the shear pins in recoupling the caster assembly to the adaptor assembly instead of replacing an expensive caster assembly. In one embodiment a structural member of the trash container serves as an adaptor.

An object of the present invention is the provision of an improved caster protector.

Another object of the invention is the provision of an improved caster protector for trash containers.

A further object of the invention is the provision of a caster protector which is inexpensive to manufacture and extremely convenient in use.

Other objects and many of the attendant advantages of the invention will be readily appreciated as the same becomes better understood by reference to the following detailed description when considered in connection with the accompanying drawings in which like reference numerals designate like parts throughout the Figures thereof and wherein.

DETAILED DESCRIPTION OF THE INVENTION

Figure 1:
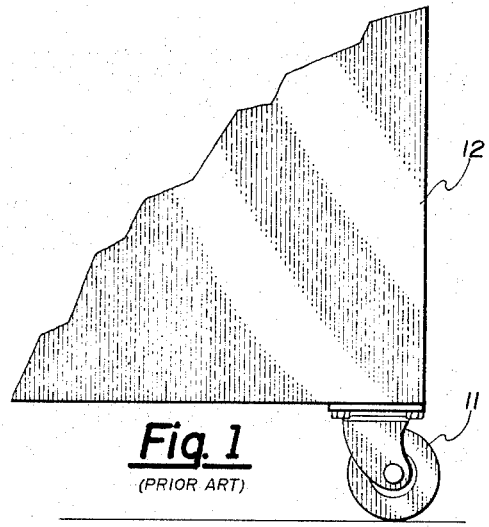
FIG. 1 is a side elevation view of a typical prior art caster assembly.

Referring to FIG. 1, a trash container is shown generally at 12 with caster assembly 11 fixedly attached to a bottom surface thereof.

Figure 2:
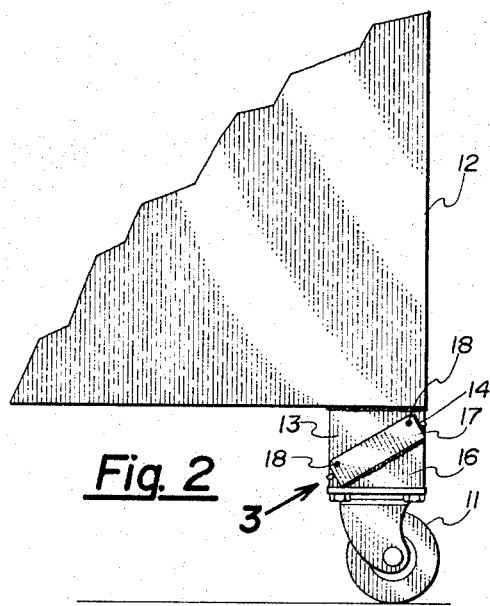
FIG. 2 is a side elevation view of a preferred embodiment of the present invention.

Referring to FIG. 2, trash container 12 has an adaptor plate 13 coupled to a bottom surface thereof. A straddle plate 18 straddles adaptor bracket 13 and adaptor bracket 16. Straddle plate 18 is welded to adaptor 16 and is coupled to adaptor bracket 13 via shear pins 18. Caster assembly 11 is mounted on the bottom of adaptor 16.

Figure 3:
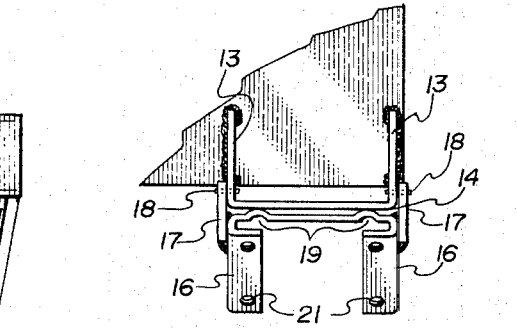
FIG. 3 is a front elevation view of the embodiment of FIG. 2.

Referring to FIG. 3, trash container 12 has adaptor 13 welded thereto. Straddle plate 18 is welded to adaptor plate 16 and is removably coupled to adaptor bracket 13 via shear pins 18. Adaptor plate 16 terminates in a pair of flanges having mounting holes 21 therein for coupling to a standard caster assembly. Adaptor plate 16 also has a pair of protuberances 19 abutting adaptor bracket 13 which minimizes contact and attendant corrosion and friction. A plane indicated at 14 in FIGS. 2 and 3 indicates the bearing plane between adaptor plate 16 and adaptor bracket 13.

Figure 4:
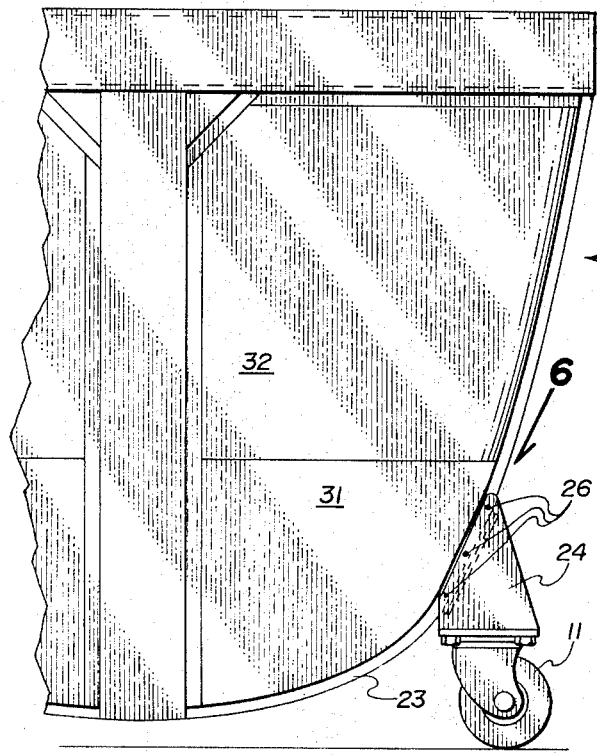
FIG. 4 is a side elevation view of another embodiment of the present invention.

Referring to FIG. 4, a modern trash container is indicated generally at 22 having an outside frame member 23 with an adaptor bracket 24 coupled to a frame member 23 via shear pins 26. Caster assembly 11 is bolted to adaptor bracket 24.

Figure 5:
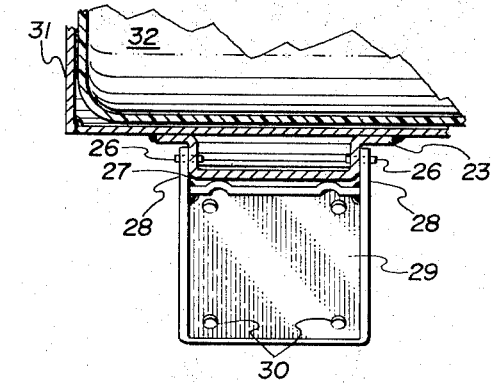
FIG. 5 is a front elevation view of the embodiment of FIG. 4 with the caster assembly removed.

Referring to FIG. 5, an inner metallic liner 31 is carried by frame member 23. Inner plastic liner 32 is carried by metallic liner 31. Adaptor bracket 24 has sides 28 which are coupled to frame member 23 via shear pins 26. Adaptor bracket 24 has protuberances 27 in contact with frame member 23 and a bottom plate 29 with a plurality of mounting holes 31 for a caster assembly.

OPERATION

Referring back to FIG. 1, it can be seen that the entire load on caster assembly 11 rests on the caster itself and its axle. This arrangement has resulted in expensive breakage of casters which are expensive and troublesome to replace.

Referring to FIGS. 2 and 3, the lead bearing points are shown at the contact of protuberances 19 on lower surfaces of adaptor bracket 13. Upon a predetermined impact the protuberances 19 will give slightly and allow shear pins 18 to receive the bulk of the impact, resulting in their shearing. When this happens, the caster adaptor plate 16 is free to slide along bearing plane 14 resulting in a saving of the caster assembly 11. Caster assembly 11 together with adaptor plate 16 is then merely recoupled to adaptor bracket 13 via new shear pins 18.

Referring to FIGS. 4 and 5, a variation is shown which, through the use of a more modern trash container assembly, utilizes a frame member 23 in place of adaptor bracket 13 which allows the entire adaptor to be contiguous while retaining the identical principle of the embodiments of FIGS. 2 and 3. Here the same sequence takes place upon an overload, i.e., protuberances 25 yield slightly, allowing shear pins 26 to absorb an overload, resulting in their shearing and freeing of caster assembly 11 together with the adaptor bracket 24. Again the shear pins need only be replaced and not the caster assembly.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A caster protector for protecting casters attached to the bottom area of any desired implement comprising:
   an adaptor plate attached to the bottom area of an implement, said adaptor plate having a plurality of apertures therein;

said adaptor plate having first and second sides, said first and second sides having a plurality of apertures therein;

a caster assembly rotatably carrying a caster at its bottom portion and having first and second upwardly extending extensions with a plurality of apertures therein, said first and second upwardly extending extensions being dimensioned for geometrically mating with said first and second sides and said apertures in said first and second upwardly extending extensions being positioned for axial alignment with said apertures in said first and second sides; and A plurality of shear pins coupling the apertures in said upwardly extending extensions and said apertures in said first and second sides.

2. The caster protector of claim 1 wherein:
said caster assembly and said adaptor plate have abutting load-bearing surfaces.

3. The caster protector of claim 2 wherein one of said abutting load-bearing surfaces comprise a plurality of protuberances abutting a substantially flat surface for absorbing any load beneath a predetermined shear level.

4. The caster protector of claim 2 wherein said abutting surfaces are not parallel to any surface on which said caster rests.

* * * * *